(12) United States Patent
Caine et al.

(10) Patent No.: US 7,384,005 B1
(45) Date of Patent: Jun. 10, 2008

(54) TANK SPRAY HEAD ASSEMBLY

(75) Inventors: Donald R. Caine, Greensboro, NC (US); William T. Brockington, Kernersville, NC (US)

(73) Assignee: Camco Manufacturing, Inc., Greensboro, NC (US)

( * ) Notice: Subject to any disclaimer, the term of this patent is extended or adjusted under 35 U.S.C. 154(b) by 383 days.

(21) Appl. No.: 11/049,077

(22) Filed: Feb. 2, 2005

(51) Int. Cl.
 *B05B 3/00* (2006.01)
 *A62C 31/00* (2006.01)
(52) U.S. Cl. .................. 239/229; 239/251; 239/443; 239/245
(58) Field of Classification Search ...... 239/225.1–246, 239/257, 288, 288.5; 134/170, 166, 172, 134/176, 177, 179; 285/386–388, 354, 38
See application file for complete search history.

(56) References Cited

U.S. PATENT DOCUMENTS

| | | | |
|---|---|---|---|
| 2,061,987 A | | 11/1936 | Sorensen |
| 2,283,780 A | | 5/1942 | Ahern |
| 2,880,938 A | * | 4/1959 | Stewart et al. ............. 239/245 |
| 2,930,531 A | * | 3/1960 | Kennedy, Jr. ............. 239/229 |
| 2,954,038 A | * | 9/1960 | Girard .................. 134/167 R |
| 2,992,781 A | * | 7/1961 | Howard, Sr. ............. 239/246 |
| 3,023,428 A | | 3/1962 | Otteson |

(Continued)

OTHER PUBLICATIONS

RV News, Oct. 2003, vol. 29, No. 3, "Supplier Spotlight: All Pro Water Flow", obtained from http://www.rv-news.com/oct2003/spotlight.cfm, all.*

(Continued)

*Primary Examiner*—Len Tran
*Assistant Examiner*—James S Hogan (57) ABSTRACT

A spray head assembly is provided for use in RV's, motor homes, campers and the like having gray and black water waste tanks. The spray head assembly allows for easy and thorough cleaning of the tanks to rid the tanks of sludge and debris that accumulates therein potentially causing unsanitary and unsafe conditions. Different forms of the invention are described for either retro-fitting or for factory installation on new RV's. The preferred form of the spray head assembly includes a mount having a planar flange for attachment to the outside wall of an RV waste tank. An aperture formed in the tank wall allows the spray head assembly to penetrate therethrough. By attaching a water conduit to the spray head assembly the nozzle of the spray head assembly will rapidly rotate by the pressurized water directed therein and will forcefully spray water through a plurality of channels in the nozzle. The sprayed water strikes the interior tank walls with great force, dislodging the sludge and debris buildup.

20 Claims, 5 Drawing Sheets

U.S. PATENT DOCUMENTS

| | | | |
|---|---|---|---|
| 3,331,456 A | | 7/1967 | Pittman |
| 3,563,464 A | * | 2/1971 | Doornbos et al. ............ 239/142 |
| 3,762,650 A | | 10/1973 | Radecki |
| 3,994,310 A | * | 11/1976 | Brandon ................. 134/167 C |
| 4,030,513 A | * | 6/1977 | McKenzie .............. 134/167 R |
| 4,865,257 A | | 9/1989 | Bailey |
| 4,887,852 A | * | 12/1989 | Hancock ................ 285/148.13 |
| 5,135,015 A | | 8/1992 | Young |
| 5,160,176 A | * | 11/1992 | Gale ....................... 285/145.3 |
| 5,211,337 A | * | 5/1993 | Lukez ........................ 239/251 |
| 5,253,664 A | | 10/1993 | Wilson |
| D357,097 S | | 4/1995 | Lee |
| D362,935 S | | 10/1995 | Lee |
| 5,497,514 A | | 3/1996 | Miller |
| 5,573,187 A | | 11/1996 | Proctor |
| 5,884,842 A | | 3/1999 | Caine et al. |
| 6,581,593 B1 | * | 6/2003 | Rubin et al. ............ 128/202.27 |
| 2005/0260043 A1 | * | 11/2005 | Lange et al. ................. 406/136 |

OTHER PUBLICATIONS

Photocopies of two pages from Camping World, Inc., catalog, cover page and p. 386 showing two holding tank rod cleaners (undated).
RV Quickie Flush Instructions for Installation, undated, 1 page.
Page 1 from Valterra Products, Inc., 1996 RV catalog showing "Rinse-A-Tank" wand.

* cited by examiner

TANK SPRAY HEAD ASSEMBLY

FIELD OF THE INVENTION

The invention herein pertains to spray heads for cleaning the interior of tanks or the like and particularly pertains to cleaning gray and black water tanks on RV's, motor homes, campers or other mobile facilities.

DESCRIPTION OF THE PRIOR ART AND OBJECTIVES OF THE INVENTION

In recent years owners of RV's, motor homes and campers have been increasingly concerned with the cleaning, maintenance, safety and sanitation of their vehicles. Both gray and black water tanks are subject to bacteria growth which can cause noxious odors and raise health concerns. The removal of such tanks for cleaning and maintenance purposes is expensive and merely "flushing" the tanks with fresh water or chemicals is seldom thorough in removing all the solid debris as sludge and sediment often strongly adheres to the inner tank walls. To help with this problem various types of hand held spray wands, some with rotating heads have been used. These wands are generally inserted through the toilet and operate to clean the interior tank walls. However, such hand held devices do not always produce the desired effect since they operate without precise positioning and as observation is not possible, sludge deposits and debris in the tank often remains.

Thus in view of the problems and inadequacies of current tank cleaning devices and methods, the present invention was conceived and one of its objectives is to provide a tank spray head assembly which can be mounted at a precise location within the tank for optimum cleaning.

It is yet another objective of the present invention to provide a tank spray head assembly which can be readily installed and connected to a fresh water supply.

It is still a further objective of the present invention to provide a tank spray head assembly which is positioned to clean all the tank walls in a fast, convenient manner.

It is yet another objective of the present invention to provide a tank spray head assembly which is durable and relatively inexpensive to manufacture and install.

Various other objectives and advantages of the present invention will become apparent to those skilled in the art as a more detailed description is set forth below.

SUMMARY OF THE INVENTION

The aforesaid and other objectives are realized by providing a spray head assembly having a mount with a planar flange for attachment through a tank outer wall of an RV, motor home or camper. A rotatable nozzle is affixed to the mount on one side and on the other side a fixed threaded coupler is provided for attachment to a threaded water conduit. Water flowing through the conduit under pressure will pass through the mount and into the nozzle. A pair of opposingly positioned motor channels within the nozzle allows the water to exit in a direction normal to the longitudinal axis of the nozzle. Body spray channels and nose spray channels of the nozzle deliver high pressure streams of water which strike the interior tank walls in a circular motion to clean the same, removing sludge and debris as the nozzle rotates.

In an alternate embodiment of the invention, a spray head assembly is provided having a rotatable coupler for releasably, temporarily connecting to a water conduit such as a garden hose. In this embodiment a back flow check valve is provided to prevent water from discharging from the nozzle into or through the water conduit. A screen filter is also provided which can be inserted into the coupler prior to attachment of the garden hose.

During installation of the spray head assembly on a tank a wedge-shaped spacer can be used to accommodate tank walls which are slanted. As the nozzle preferably rotates around its longitudinal axis which is substantially horizontal for optimum tank wall cleaning, the spacer maintains the spray head assembly in a level, horizontal posture.

DETAILED DESCRIPTION OF THE PREFERRED EMBODIMENT AND OPERATION OF THE INVENTION

Figures 1, 2:
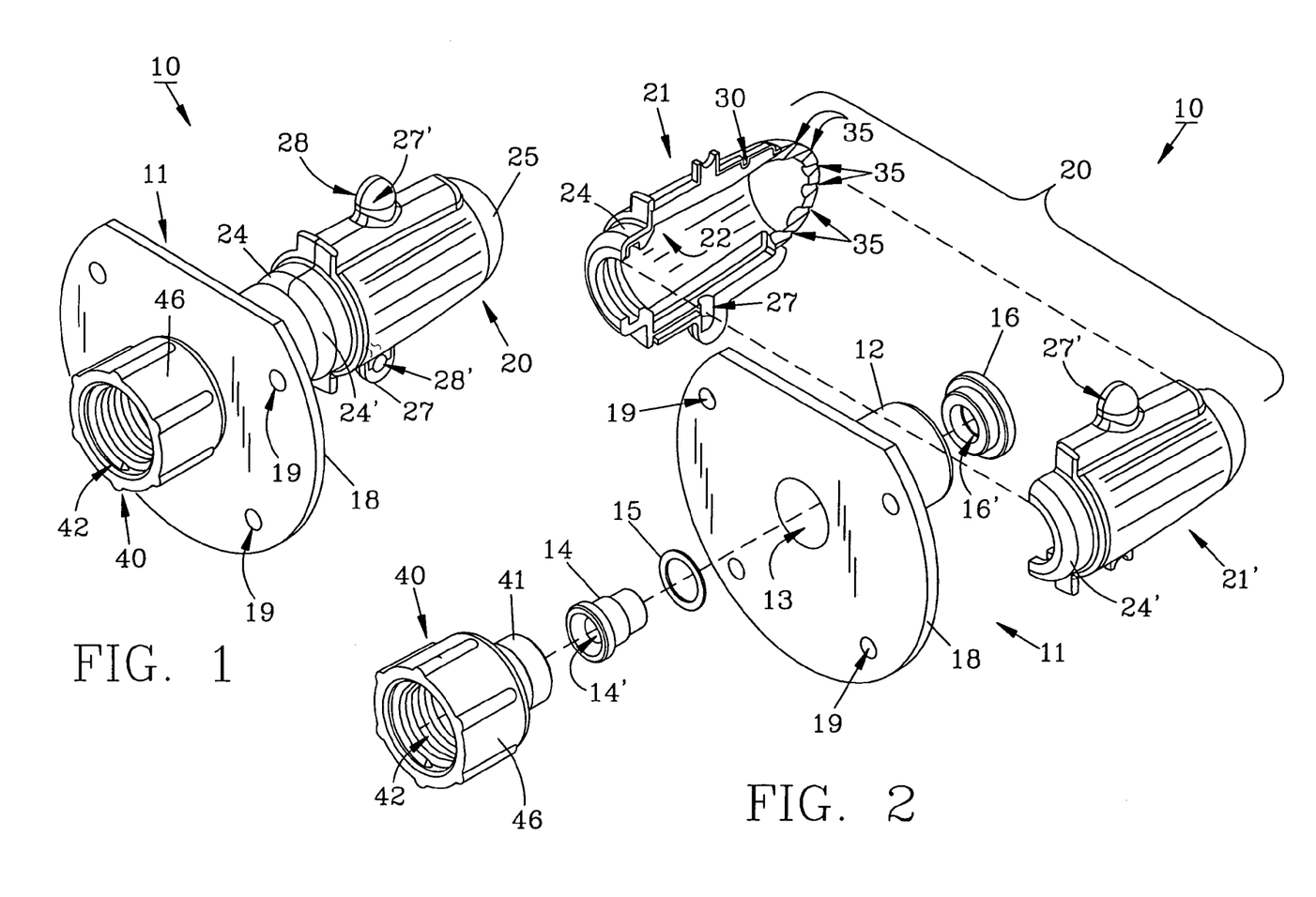
FIG. 1 illustrates a perspective view of the preferred spray head assembly of the invention.
FIG. 2 shows the spray head assembly of FIG. 1 in a somewhat exploded fashion.

For a better understanding of the invention and its operation, turning now to the drawings, FIG. 1 shows in perspective view preferred spray head assembly 10 molded by conventional techniques from polycarbonate or other suitable materials and includes mount 11, nozzle 20 and coupler 40. FIGS. 1-6 illustrate preferred tank spray head assembly 10 in various views before installation for clarity purposes. FIG. 7 shows a typical use of spray head assembly 10 as fitted on RV gray water tank 75.

FIG. 2 demonstrates in exploded form preferred spray head assembly 10 prior to assembly. As shown, coupler 40 comprises threaded coupler ring 46 integrally formed with coupler stem 41 and includes coupler channel 42 for allowing water from a conduit (not shown in FIG. 2) to pass therethrough. Mount 11 comprises mount channel 13 (also seen in FIG. 6), mount planar flange 18 which includes four (4) mounting apertures 19 (FIG. 3), and mount stem 12. Swivel head 14, having channel 14', receives washer 15 thereon and is placed within mount channel 13 from mount flange 18, such that washer 15 is positioned between swivel head 14 and mount stem 12 whereby swivel head 14 extends beyond mount channel 13. Swivel mount 16 includes channel 16' for receiving swivel head 14 and is fitted from the opposite side of mount 11 to swivel head 14 extending therefrom (FIG. 6) and ultrasonically welded thereto whereby swivel head 14 is rotatably affixed within mount stem 12. Washer 15 preferably comprises a brass washer and provides a wear surface between mount stem 12 and swivel head 14 as washer 15 is rotatably affixed on swivel head 14 and between the same and mount stem 12.

It should be understood that coupler ring 46 and coupler stem 41 are integrally formed such as by conventional molding and coupler stem 41 frictionally engages the interior of mount channel 13 and is ultrasonically welded therein during assembly. It should also be understood that coupler ring 46 does not rotate as it is rigidly joined to coupler stem 41.

As further seen in FIG. 2, nozzle body half 21' is a mirror image of nozzle body half 21' and is formed to include ring half 24, motor channel 27 and body spray channel 30. As would be understood body half 21' is identically formed, so that in joining halves 21, 21', L-shaped motor channels 27, 27' form motor channel outlets 28, 28'. During assembly ring halves 24, 24' of body halves 21, 21' each frictionally engage swivel mount 16 to allow rotation of nozzle 20 therewith. Once assembled, body halves 21, 21' are ultrasonically welded together thereby forming nozzle 20 with nozzle channel 22 (partially seen in FIG. 2) therewithin. Nozzle 20 is rotationally affixed to mount 11 and will rotate at a high speed in relation thereto during operation.

Figure 3:
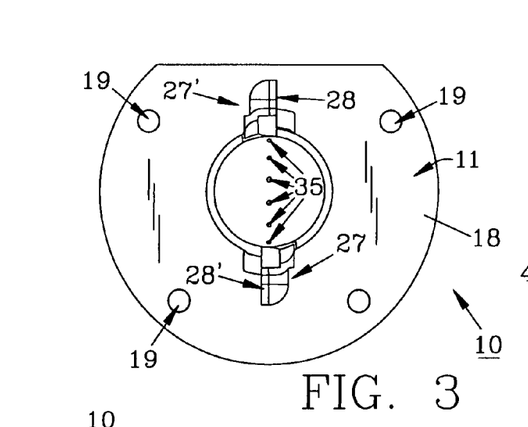
FIG. 3 demonstrates a front elevational view of the assembly as seen in FIG. 1.
Figure 4:
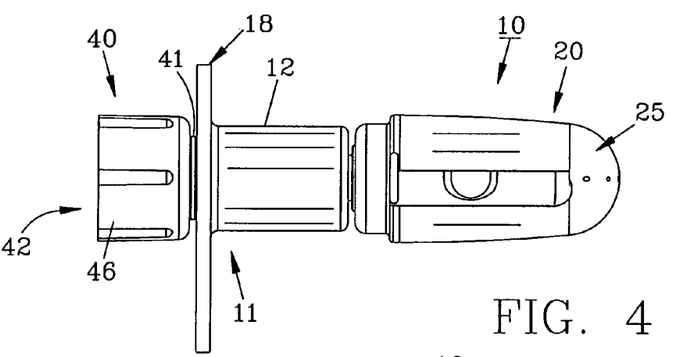
FIG. 4 depicts a left side elevational view of the assembly as seen in FIG. 1, the right side being a mirror image thereof.
Figure 6:
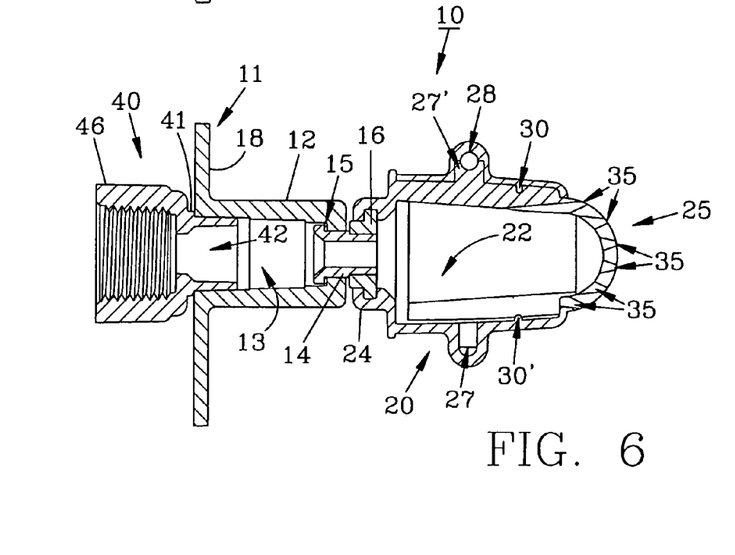
FIG. 6 pictures a cross-sectional view of the assembly as along lines 6-6 in FIG. 5.
Figures 7, 8:
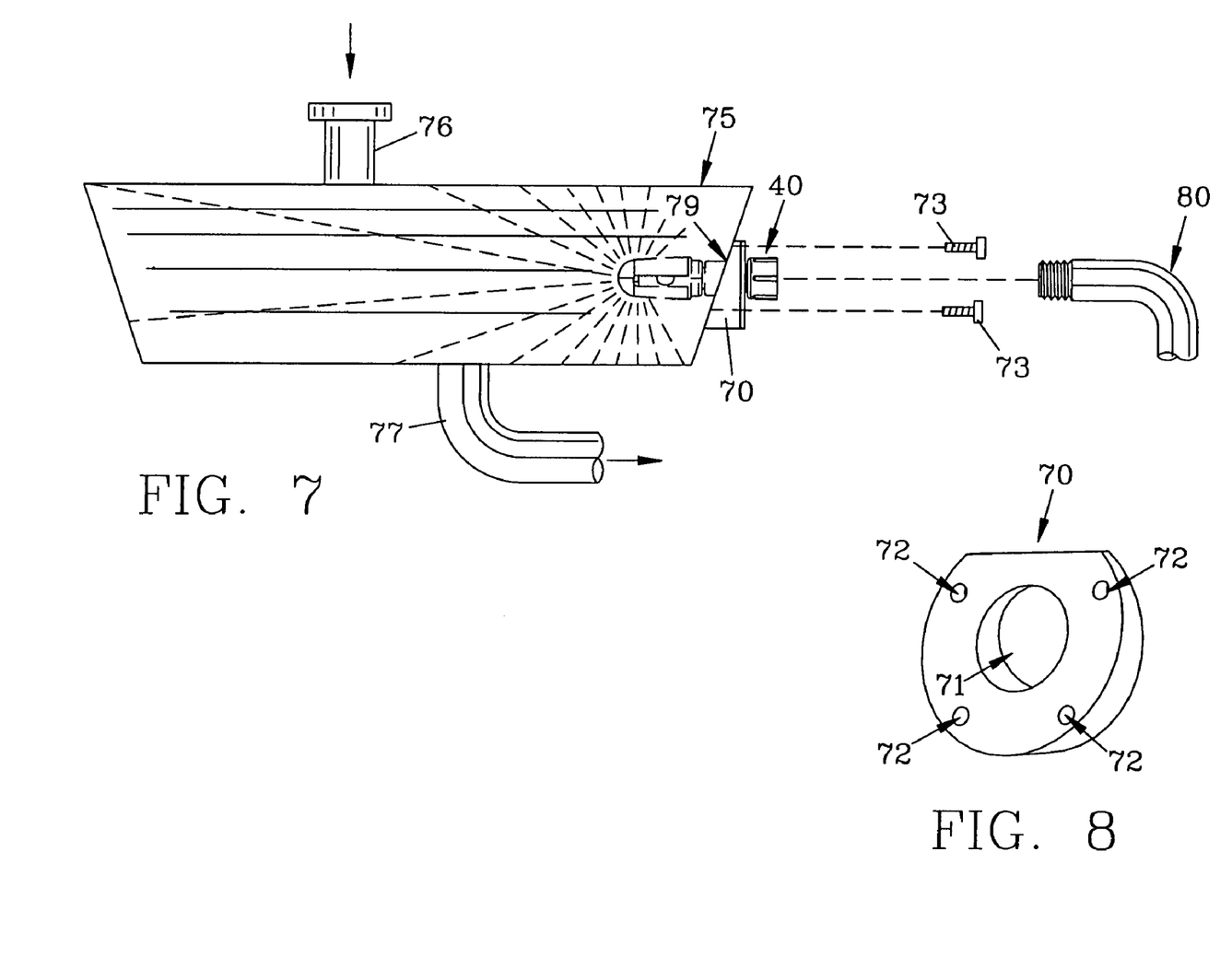
FIG. 7 illustrates a conventional RV gray water tank as removed from the RV and the spray head assembly mounted therein with a schematic representation of the water spray.
FIG. 8 shows an enlarged perspective view of the spacer as shown in FIG. 7.

In FIG. 6, spray head assembly 10 is shown in cross-section whereby a water conduit (not shown) threadably attached to coupler 40 would allow water to pass into coupler channel 42 through mount channel 13, swivel channel 14' and into nozzle channel 22 under pressure, further flowing through L-shaped motor channel outlets 28, 28' as shown in FIGS. 1, 3 and 6. Motor channel outlets 28, 28' allow water to exit nozzle 20 in generally parallel but opposing directions, thereby creating torque on nozzle 20 and accordingly, rotation thereof. In addition, water entering nozzle 20 passes through opposing body spray channels 30, 30' also shown in FIG. 6, in a direction normal to the longitudinal axis of nozzle 20. Thus, large motor channel outlets 28, 28' and body spray channels 30, 30' direct high pressure water streams in a circular pattern to clean and wash the interior of tank 75 as nozzle 20 rotates as seen schematically in FIG. 7. Further, nozzle 20 is seen in FIGS. 3 and 6 having dome shaped nose 25 with six (6) relatively small conically shaped spray channels 35. Nose spray channels 35 likewise deliver high pressure water in circular streams to the interior of tank 75 having waste inlet 76 as shown in FIG. 7 to wash and clean the same during rotation of nozzle 20 with removal through waste outlet 77. Tank 75 is drained prior to cleaning for more thorough cleaning thereof.

Figure 5:
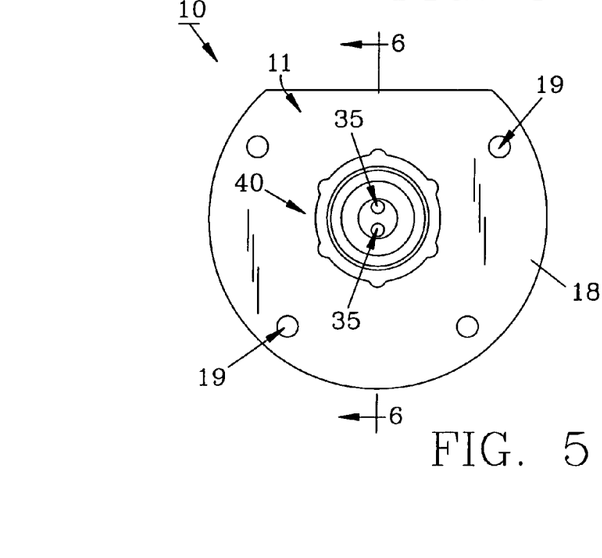
FIG. 5 features a rear elevational view thereof.

Mount 11 shown in FIGS. 3 and 5 provides planar flange 18 having a D-shape for assistance in mounting spray head assembly 10 when encountering space constraints during installation. As shown in FIG. 7, tank opening 79 is formed within an outside wall of tank 75 to allow access for nozzle 20 for mounting purposes. During installation in tank 75, which has slanted walls, wedge-shaped spacer 70, preferably formed from a durable plastic, is provided to maintain spray head assembly 10 in a horizontal posture. As seen in FIG. 8, spacer 70 comprises channel 71 for receiving nozzle 20 and four (4) fastener channels 72 for alignment with mounting apertures 19 of flange 18 for accepting fasteners 73 (FIG. 7). As would be understood, wedge-shaped spacer 70 may not be necessary in all installations such as in installations on tanks having straight walls as opposed to the slanted walls of tank 75 seen in FIG. 7.

In operation, water from conduit 80 seen in FIG. 7 which can be threadably joined to coupler 40 is directed through coupler channel 42, mount channel 13, swivel channel 14' and into nozzle channel 22 (FIG. 6) where it then exits under pressure through large nozzle motor channel outlets 28, 28', small body spray channels 30, 30' and six (6) small nose spray channels 35. The exiting water from spray head assembly 10 thus provides a cleaning and scrubbing effect on the interior of tank 75 to remove debris, bacterial growth and other foreign matter accumulated therein.

Figures 9, 10:
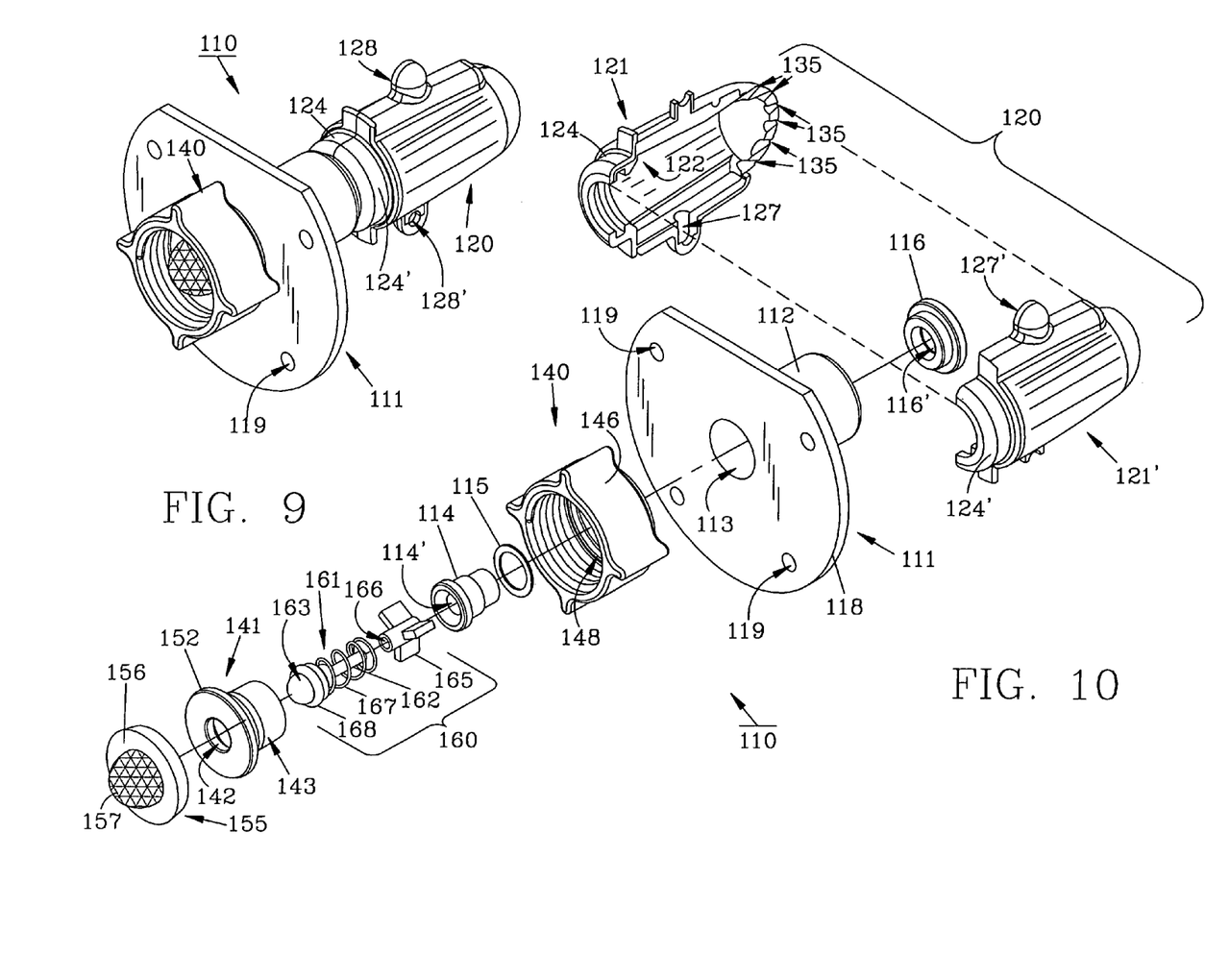
FIG. 9 demonstrates a perspective view of an alternate embodiment of the spray head assembly.
FIG. 10 pictures an exploded version of the alternate spray head assembly as shown in FIG. 9.
Figure 11:
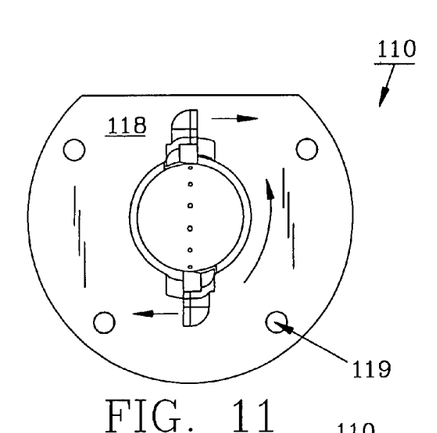
FIG. 11 illustrates a front elevational view of the spray head assembly as shown in FIG. 9.
Figure 12:
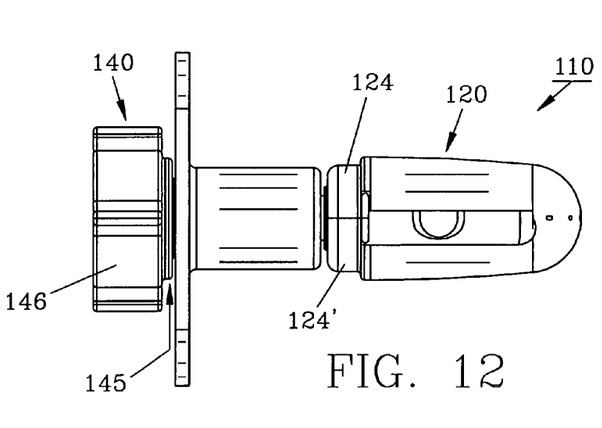
FIG. 12 demonstrates a left side elevational view of the spray head assembly as shown in FIG. 9, the right side being a mirror image thereof.
Figure 13:
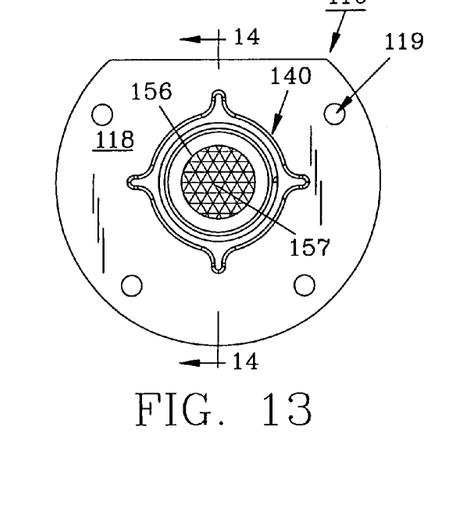
FIG. 13 features a rear elevational view of the spray head assembly as shown in FIG. 9.

An alternate embodiment of the invention is shown in FIGS. 9-14, whereby spray head assembly 110 is seen assembled in FIG. 9 and exploded in FIG. 10. Spray head assembly 110 includes mount 111, nozzle 120, coupler 140 and check valve 160. Swivel head 114, having channel 114', and washer 115 are placed within mount channel 113 from mount flange 118. Swivel mount 116 includes channel 116' for receiving swivel head 114 and is fitted from the opposite side of mount 111 to swivel head 114 (FIG. 14) and ultrasonically welded thereto whereby swivel head 114 is rotatably affixed within mount 111. Washer 115 preferably comprises a brass washer and provides a wear surface between mount stem 112 and swivel head 114. Washer 115 is rotatable against mount stem 112 whereby washer 115 may rotate at a different rate than swivel head 114. Nozzle 120 is affixed to swivel mount 116 and includes relatively large L-shaped motor channel outlets 128, 128' for providing rotational forces to nozzle 120 to rotate the same as seen by the curved arrow in FIG. 11. As seen in FIGS. 10 and 12, nozzle 120 includes ring halves 124, 124' which upon assembly frictionally engage swivel mount 116 to allow nozzle 120 to rotate as earlier described regarding preferred spray head assembly 10.

Coupler 140 comprises threaded coupler ring 146, rotationally affixed on coupler stem 141. Coupler ring 146 defines circular flange 145 and channel 148 for receiving coupler stem 141. Coupler stem 141 includes shoulder 143 (FIG. 10) for engagement with mount flange 118 as coupler stem 141 is received in mount channel 113 and ultrasonically welded to mount 111 for retaining coupler ring flange 145 between mount flange 118 and coupler stem flange 152. Thus, coupler ring 146 rotates about coupler stem 141 for connection to or disconnection from a garden hose, pipe or other threaded water conduit.

Figure 14:
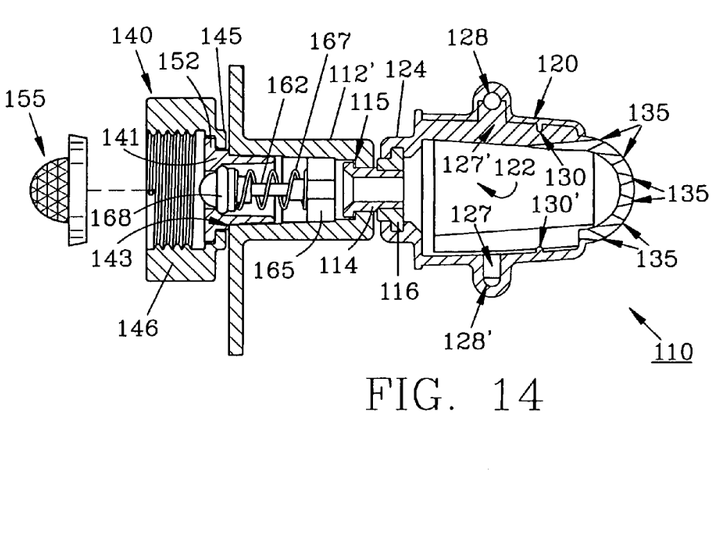
FIG. 14 depicts a cross-sectional view of the spray head assembly as along lines 14-14 in FIG. 13 with the filter spaced therefrom.

As further shown in FIG. 10, check valve 160 comprises plunger 161 having shaft 162 with plunger coil spring 167 thereon joined to semi-spherical head 163 with o-ring 168 therearound. Finned plunger retainer 165 is frictionally mounted within mount channel 113 and positioned on mount stem shoulder 112'. Plunger shaft 162 is slightly received within channel 166 of retainer 165 as seen in FIG. 14 to maintain check valve 160 in axial alignment within coupler stem 141 and to retain coupler spring 167 thereabout between retainer 165 and plunger head 163. Retainer 165 is contiguous swivel head 114 and washer 115. Swivel mount 116 is joined to swivel head 114 as described earlier. Check valve 160 prevents backflow or leakage of water from coupler stem channel 142 into coupler ring channel 148 as plunger spring 167 urges plunger head 163 into coupler stem channel 142 which closes the same as o-ring 168 engages the inside of coupler stem 141. Filter 155 prevents dirt or debris from entering nozzle 120 and potentially clogging body spray channels 130, 130', conically shaped nose spray channels 135 and motor channel outlets 128, 128'. Standard filter 155, which includes washer 156 joined to conically shaped filter screen 157, is positioned in coupler 140 atop coupler stem 141.

In operation, water under pressure passing through filter 155 impacts plunger head 163 and opens coupler stem channel 142 allowing water to enter mount stem channel 113 by compressing plunger spring 167 against retainer 165, sliding plunger shaft 162 further into retainer channel 166 (FIG. 10) and disengaging o-ring 168 from the inside of coupler stem 141 thus opening coupler stem channel 142. Water is then forcefully directed passed check valve 160 through swivel mount channel 114' into nozzle channel 122 of nozzle 120. Large motor channels 127, 127' which are L-shaped disperse the forced water through motor channel outlets 128, 128', causing nozzle 120 to rotate. Simultaneously therewith the forced water enters smaller body spray channels 130, 130' to direct water in a direction parallel to that exiting motor channel outlets 128, 128' to clean the interior tank walls. Small nose spray channels 135 likewise deliver forced water streams which strike the interior tank walls for cleaning and debris removal.

Tank spray head assembly 110 is generally used for after market installations for retrofitting RV's whereas preferred spray head assembly 10 may be used in factory installations for new RV's.

The illustrations and examples provided herein are for explanatory purposes and are not intended to limit the scope of the appended claims.

We claim:

1. A tank spray head comprising: a mount, said mount comprising a D-shaped planar flange and a mount stem, said mount stem joined to said mount, said mount for attaching said spray head to a tank, a nozzle, said nozzle rotatably joined to said mount stem, a coupler, said coupler comprising a coupler stem and a coupler ring, said coupler ring rotatably affixed to said coupler stem, said coupler stem received in said mount stem, said coupler affixed to said mount in opposing relation to said nozzle, said nozzle comprising a cylindrical body, said cylindrical body defining a nose, said body defining an interior channel, said interior channel terminating within said nose, and a motor channel, said motor channel defined within said nozzle body and in fluid communication with said interior channel, whereby water entering said interior channel will exit said motor channel to rotate said nozzle.

2. The tank spray head of claim 1 wherein said planar flange defines a mounting aperture.

3. The tank spray head of claim 1 wherein said motor channel is L-shaped.

4. The tank spray head of claim 1 wherein said coupler ring defines a threaded channel.

5. The tank spray head of claim 1 further comprising a check valve mounted in said mount stem.

6. The tank spray head of claim 1 further comprising a filter positioned within said coupler ring.

7. The tank spray head of claim 6 wherein said filter comprises a filter washer and a filter screen, said filter screen affixed to said filter washer.

8. A tank spray head comprising: a mount, said mount comprising a planar flange and a mount stem, said mount stem joined to said mount, said mount for attaching said spray head to a tank, a nozzle, said nozzle rotatable joined to said mount stem, a coupler, said coupler comprising a coupler stem and a coupler ring, said coupler ring rotatable affixed to said coupler stem, said coupler stem received in said mount stem, said coupler affixed to said mount in opposing relation to said nozzle, said nozzle comprising a cylindrical body, said cylindrical body defining a nose, said nose defining a conically shared spray channel, said body defining an interior channel, said interior channel terminating within said nose, said nose spray channel in fluid communication with said interior channel, and a motor channel, said motor channel defined within said nozzle body and in fluid communication with said interior channel, whereby water entering said interior channel will exit said motor channel to rotate said nozzle.

9. The tank spray head of claim 8 wherein said coupler ring defines a threaded channel.

10. The tank spray head of claim 8 further comprising a filter positioned within said coupler ring.

11. The tank spray head of claim 8 further comprising a check valve mounted in said mount stem.

12. A tank spray head comprising: a mount, said mount comprising a planar flange and a mount stem, said mount stem joined to said mount, said mount for attaching said spray head to a tank, a check valve, said check valve mounted in said mount stem, said check valve comprising a plunger shaft, a plunger head, said plunger shaft affixed to said plunger head, an o-ring, said o-ring affixed to said plunger head, a plunger spring, said plunger spring slidably received on said plunger shaft, a plunger retainer, said plunger retainer for receiving said plunger shaft whereby said plunger spring engages said plunger head and said plunger retainer, a nozzle, said nozzle rotatable joined to said mount stem, a coupler, said coupler comprising a coupler stem and a coupler ring, said coupler ring rotatable affixed to said coupler stem, said coupler stem received in said mount stem, said coupler affixed to said mount in opposing relation to said nozzle, said nozzle comprising a cylindrical body, said cylindrical body defining a nose, said body defining an interior channel, said interior channel terminating within said nose, and a motor channel, said motor channel defined within said nozzle body and in fluid communication with said interior channel, whereby water entering said interior channel will exit said motor channel to rotate said nozzle.

13. The tank spray head of claim 12 wherein said nozzle body defines a spray channel, said body spray channel in fluid communication with said interior channel.

14. The tank spray head of claim 12 further comprising a filter, said filter positioned within said coupler ring.

15. The tank spray head of claim 14 wherein said filter comprises a filter washer and a filter screen, said filter screen affixed to said filter washer.

16. A tank spray head comprising: a mount, said mount for attaching said spray head to a tank, said mount comprising a planar mount flange and a mount stem, said mount stem attached to said mount flange, a check valve, said check valve positioned in said mount stem, a nozzle, said nozzle rotatably joined to said mount stem, a coupler, said coupler affixed to said mount in opposing relation to said nozzle, said nozzle comprising a cylindrical body, said body defining a dome-shaped nose, said dome-shaped nose defining a spray channel, said body further defining an interior channel, a motor channel, said motor channel defined within said body, and said interior channel in fluid communication with said motor channel and said nose spray channel whereby water entering said interior channel can exit through said motor channel and said nose spray channel.

17. The tank spray head of claim 16 wherein said check valve comprises a plunger shaft, a plunger head, said plunger shaft affixed to said plunger head, an o-ring, said o-ring affixed to said plunger head, a plunger spring, said plunger spring slidably received on said plunger shaft, a plunger retainer, said plunger retainer receiving said plunger shaft whereby said plunger spring engages said plunger head and said plunger retainer.

18. The tank spray head of claim 17 further comprising a filter, said filter comprising a filter washer and a filter screen, said filter screen affixed to said filter washer, said filter received within said coupler stem.

19. The tank spray head of claim 16 wherein said motor channel is L-shaped.

20. The tank spray head of claim 16 wherein said coupler comprises a coupler stem, said coupler stem affixed to said mount, and a coupler ring, said coupler ring rotatably affixed to said coupler stem, said coupler stem affixed to said mount.

* * * * *